(12) United States Patent
Peters et al.

(10) Patent No.: US 8,702,005 B2
(45) Date of Patent: Apr. 22, 2014

(54) OPTICALLY VARIABLE ELEMENTS COMPRISING AN ELECTRICALLY ACTIVE LAYER

(75) Inventors: John Anthony Peters, Au (CH); Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 114 days.

(21) Appl. No.: 11/792,107

(22) PCT Filed: Dec. 5, 2005

(86) PCT No.: PCT/EP2005/013008
§ 371 (c)(1), (2), (4) Date: Jul. 25, 2007

(87) PCT Pub. No.: WO2006/061171
PCT Pub. Date: Jun. 15, 2006

(65) Prior Publication Data
US 2008/0259416 A1    Oct. 23, 2008

(30) Foreign Application Priority Data
Dec. 10, 2004  (DE) .................. 10 2004 059 798

(51) Int. Cl.
*G06K 19/06* (2006.01)
(52) U.S. Cl.
USPC ........................................ 235/492
(58) Field of Classification Search
USPC ........................................ 235/492
See application file for complete search history.

(56) References Cited

U.S. PATENT DOCUMENTS

| | | | |
|---|---|---|---|
| 3,476,029 A | 11/1969 | Schreckendgust | |
| 4,220,956 A | 9/1980 | Sanford | |
| 4,472,627 A * | 9/1984 | Weinberger | 235/487 |
| 4,856,857 A | 8/1989 | Takeuchi et al. | |
| 4,889,366 A * | 12/1989 | Fabbiani | 283/86 |
| 6,215,593 B1 | 4/2001 | Bruce | |
| 6,429,461 B1 | 8/2002 | Tanaka et al. | |
| 6,483,613 B1 * | 11/2002 | Woodgate et al. | 359/19 |
| 6,830,192 B1 | 12/2004 | Krul et al. | |
| 7,333,072 B2 | 2/2008 | Yamazaki et al. | |
| 2001/0020935 A1* | 9/2001 | Gelbman | 345/173 |
| 2002/0160786 A1* | 10/2002 | Rietzler et al. | 455/455 |
| 2003/0063186 A1 | 4/2003 | Tomono | |

(Continued)

FOREIGN PATENT DOCUMENTS

| | | |
|---|---|---|
| CA | 2338661 | 2/2000 |
| DE | 101 63 267 | 7/2003 |

(Continued)

OTHER PUBLICATIONS

Sievenpiper, D. et al, High-Impendance Electromagnetic Surfaces with a Forbidden Frquency Band, IEEE Transactions on Microwave Theory and Technology, Nov. 1999, col. 47, No. 11, pp. 2059-2074.*

(Continued)

*Primary Examiner* — Christopher Stanford
(74) *Attorney, Agent, or Firm* — Hoffmann & Baron, LLP

(57) ABSTRACT

There is described a security element having at least one optically variable device, in which at least one layer of the optically variable device is in the form of an electrically active layer (13, 14) of an electronic component and/or an electronic circuit.

34 Claims, 7 Drawing Sheets

(56) References Cited

U.S. PATENT DOCUMENTS

| | | |
|---|---|---|
| 2003/0124435 A1* | 7/2003 | Rich et al. .................... 430/1 |
| 2003/0164611 A1* | 9/2003 | Schneider et al. ............ 283/57 |
| 2003/0175411 A1* | 9/2003 | Kodas et al. .................. 427/58 |
| 2003/0179150 A1* | 9/2003 | Adair et al. ................. 343/895 |
| 2004/0066340 A1 | 4/2004 | Hacker et al. |
| 2004/0179253 A1* | 9/2004 | Hamano et al. ................ 359/9 |
| 2005/0051635 A1* | 3/2005 | Attenberger et al. ......... 235/491 |
| 2005/0150740 A1 | 7/2005 | Finkenzeller et al. |
| 2005/0161501 A1 | 7/2005 | Giering et al. |
| 2006/0002656 A1* | 1/2006 | Cowan et al. .................. 385/31 |

FOREIGN PATENT DOCUMENTS

| | | | | |
|---|---|---|---|---|
| EP | 0 645 825 | 3/1995 | | |
| EP | 1 152 285 | 11/2001 | | |
| EP | 1 179 811 | 2/2002 | | |
| EP | 1 383 075 | 1/2004 | | |
| EP | 1431062 | 6/2004 | | |
| JP | 2000231995 | 8/2000 | | |
| JP | 2003075646 A * | 3/2003 | ............ | G02B 5/32 |
| JP | 2004310069 | 11/2011 | | |
| RU | 2233477 | 7/2009 | | |
| WO | WO 97/21184 | 6/1997 | | |
| WO | WO 01/03945 | 1/2001 | | |
| WO | WO 01/04832 | 1/2001 | | |
| WO | WO 02/00445 | 1/2002 | | |
| WO | WO 03043830 A1 * | 5/2003 | ............ | B42D 15/00 |
| WO | WO 03/054807 | 7/2003 | | |
| WO | WO 03/054808 | 7/2003 | | |
| WO | WO 2004/035321 | 4/2004 | | |

OTHER PUBLICATIONS

English Translation of JP 2003075646 A by Watanabe et al.*

* cited by examiner

OPTICALLY VARIABLE ELEMENTS COMPRISING AN ELECTRICALLY ACTIVE LAYER

This application claims priority based on an International Application filed under the Patent Cooperation Treaty, PCT/EP2005/013008, filed on Dec. 5, 2005 and German Application No. 102004059798.7-51, filed on Dec. 10, 2004.

FIELD OF THE INVENTION

The invention concerns a security element having at least one optically variable device (OVD).

BACKGROUND OF THE INVENTION

OVDs are used as security elements for example for banknotes, security documents or labels for goods. As their optical effect is based for example on light refraction or light diffraction at optical microstructures they cannot be counterfeited with colour copying processes.

Optically variable security elements have been proposed, which afford different optical effects in a plurality of layers:

WO 01/03945 A1 describes a security element having a transparent substrate, on one side of which there is applied a thin film which produces a perceptible colour shift in dependence on the viewing angle of the person viewing it. A diffraction pattern is applied on the opposite side of the transparent substrate to further enhance the copy protection. That diffraction pattern acts as a diffraction grating so that for example the illusion of a three-dimensional image can be created for the person viewing it by means of that two-dimensional pattern. That provides that the optical effects produced by the thin film layer and the optical effects produced by the diffractive pattern are superposed at any location of the optically variable security element and thus that affords overall an optical effect which is composed of those two effects.

WO 02/00445 A1 proposes measures for decoupling the optical effects produced in a plurality of layers of an optically variable security element, from each other. For that purpose, one possibility proposed is that of applying an opaque layer between a relief structure which produces a holographic image by means of diffraction and a thin film which produces a colour change. A further option proposed is that of arranging, in place of the opaque intermediate layer, one or more highly refractive layers and an adhesive layer. Those layers increase reflection and thus the strength of light in the region of the relief structure producing the holographic image and the holographic image is thus evident in relation to the colour shift effect of the thin film.

It is further known to use elements for radio frequency identification (RFID) as anti-theft means and for goods identification. RFID is based on wireless radio frequency communication between a transponder which is allocated to an object or a person, and a reading device. The transponder usually includes an antenna connected to a semiconductor chip. The communication between the transponder and the reading device usually involves a communication of an identification code from the transponder to the reading device.

For example U.S. Pat. No. 4,220,956 describes a manufacturing method for an RF antenna for an RFID transponder, in which the antenna is produced by etching a conductive layer of a thickness of <125 µm which is applied on one side of a thin substrate. In that case the etching process is like that for the production of printed circuits in the electronic industry.

SUMMARY OF THE INVENTION

Now the object of the invention is to provide security elements having optically variable devices which are particularly forgery-proof.

The object of the invention is attained with a security element having at least one optically variable device, wherein at least one layer of the optically variable device is in the form of an electrically active layer of an electronic component and/or an electronic circuit.

Optically variable devices present an optical effect which changes in dependence on the viewing direction and/or kind of illumination and/or illumination direction. Such effects can be generated for example by special surface reliefs (diffraction gratings, holograms), and/or by a special arrangement of thin layers (interference layer systems).

In that fashion the optically variable device and the electronic component and/or the electronic circuit form an inseparable unit. Manipulation at the optically variable device or the electronic component changes both component parts and leads to destruction of one or both component parts.

By way of example RFID transponders can be provided with information memories which can be written by laser ablation. In that process components of the memory matrix, which are not required, are destroyed by the laser action. Such a memory matrix can be in the form of a film body with organic components such as organic field effect transistors. Now, when using the solution according to the invention, any manipulation at the memory matrix leads to a change in the optical properties of the manipulated electrically active layer of the memory matrix and becomes visible in that fashion.

Electronic components can be integrated into the optically variable device with the solution according to the invention in such a way that separate, that is to say subsequent application of the optically variable device to the electronic component is difficult by virtue of the production-engineering tolerance. The electronic components must be incorporated into the optical action and therefore must be positioned with tolerances in the µm range in relation to the optically variable device. That is only possible at reasonable complication and expenditure, in a common production process.

Further advantageous configurations of the invention are set forth in the appendant claims.

The kinds of electronic components whose electrically active layers can be in the form of an optically variable device are diverse and varied.

It can be provided that the electrically active layer is in the form of the RF antenna of an RFID transponder. Such an antenna structure can also be optically evaluated in that fashion. An RF antenna of a spiral configuration can in that way form a graphic representation or be part of such a representation. Furthermore, by virtue of the microstructuring of the electrically active layer, such an RF antenna can have better electrical properties than a conventional RF antenna which is in the form of a thin layer with a flat surface.

The electrically active layer can be in the form of the electrically active layer of an inductor and/or a capacitor. Particularly if the electrically active layer is in the form of the electrically active layer of an electrical oscillator circuit, that is to say an interconnection of inductor and capacitor, the microstructuring, provided in accordance with the invention, of the surface of the electrically active layer can significantly influence the resonance frequency of the electrical oscillator circuit formed in that way. It is then no longer possible to determine the resonance frequency of the oscillator circuit only from the macro-geometrical dimensions of the electrically active layer or layers. Such a specific property of the oscillator circuit can further enhance the forgery-proof nature.

It can be provided that the electrically active layer is in the form of an electrode of an electronic component, in particular an optical display element. This can involve an optical display element which is activated by an RFID transponder. Upon activation the optical display element can produce an additional optical effect which is superposed on the optical effect produced by its electrode or electrodes in the form of the optically variable device. The optical display element can be for example an organic light emitting diode which is shaped in the form of a pattern or a number. That pattern or number, together with the optically variable background pattern produced by the electrode now forms a particular optical effect. It can however also be provided that organic light emitting diodes in point form are arranged in a pixel raster, as is known for example from flat screens. It is possible in that way to produce graphic representations with a high level of resolution. Furthermore it is possible for the optical display element to have electrochromic elements which present different colours in dependence on the applied electrical voltage. It is also possible for the optical display element to have a plurality of differently coloured or black-white and differently charged particles arranged movably between two electrode layers. Applying a voltage across the electrode layers makes it possible to alter the concentration of the one or other particles in the proximity of the one or other electrode layer so that the optical impression of the display element changes in dependence on the magnitude and/or polarity of the applied voltage. The state which is set in that way is unchanged substantially until a fresh voltage is applied. It can also be provided that the optical display element is individualised, for example in the form of a serial number, an image or a name. That can be effected for example by microstructuring of the surface of the electrode layer during the production procedure, for example by micro-demetallisation or micro-metallisation of a metallic electrode layer.

The electrically active layer can also be in the form of an electrical connecting element. It is therefore also possible for the line layout of circuit arrangements or switching circuits to be in the form of an optically variable device. Thus for example large-area conductor tracks connected to the earth potential of the circuit arrangement or the switching circuit can be incorporated into the optical configuration. Further regions without an electrical function can be arranged between the electrical functional elements in order to improve the optical impression.

The electrically active layer can be in the form of a metallic layer. Metallic layers can be applied by printing in the form of structured layers, for example in the form of printing on both sides on a polymer layer to produce an organic optical display element. They can however also be applied over a surface area, for example by sputtering, and then structured by a removal process. The microstructuring of the surface of the metallic layer can then be applied for example by a profiled roller. It can however also be provided that the layer arranged under the metallic layer is profiled and the metallic layer is applied thereto. The metallic layer can be opaque, semi-transparent or transparent in dependence on the layer thickness.

As described hereinbefore the electrically active layer can also be in the form of a micro-demetallised layer which in that way can allow a view on to layers arranged therebeneath.

The electrically active layer can also be in the form of a non-metallic layer, for example made of indium-tin oxide. A layer of indium-tin oxide can be provided if the electrically active layer is to be transparent.

It can also be provided that the electrically conducting layer is in the form of an organic layer. That can be particularly advantageous for producing organic electronic components as are organic field effect transistors from which for example organic circuits are formed.

It can further be provided that the electrically active layer is covered by at least one cover layer. Such a layer can be a protective layer for example to protect organic electronic components from environmental influences. It can also be provided however that the cover layer is in the form of a transparent diffractive structure. Such a cover layer can produce an optical effect which is superposed on the optical effect caused by the electrically active layer which is in the form of the optically variable device. This however can also involve mutually supplemental effects for example to cause the generation of partial images which when viewed jointly cause an image change which simulates a motion.

The cover layer can also be in the form of a macrostructure, for example in the form of a microlens array and/or a microprism array. Such a cover layer can cause additional optical effects. Such macrostructures are here in particular structures whose lateral dimensions are in the 100 µm range or less. A microlens array, in particular a microlens array formed from convergent lenses, can focus ambient light on to the optical display element. In that way the optical action of display elements can be improved on the basis of the principle of electrochromic elements, these also including OLEDs (organic light emitter diodes), or elements provided with mobile colour particles. It can however also be provided that the microlens array acts by superpositioning with a second microlens array like a macroscopic convergent lens, that is to say it reproduces the pixels under the microlens array on an enlarged scale. It can further be provided that a second microlens array can be disposed over the first microlens array, for example by folding a security document equipped with such security elements. In that way it is possible to form lens assemblies which are known from telescopes or microscopes. Thus for example combining divergent lenses and convergent lenses formed from microlens arrays makes it possible to produce a so-called Galileo telescope, as is known from opera glasses.

By way of example the light issuing from optical display elements can be distributed in a specifically targeted fashion with microprism arrays. The emitted light can for example be deflected in such a way that it is clearly perceived even with inclined viewing angles.

It can also be provided that the layer referred to hereinbefore as the cover layer is arranged under the optical display element. Such a cover layer can be for example in the form of a sinusoidal or sine-like linear or cross grating with numbers of lines in the region of about 200-2000 lines/mm. If the optical display element is in the form of an LED the light issuing at the underside of the optical display element can thus be reflected. It is also possible to provide a reflecting Fresnel lens for that purpose.

The solution according to the invention includes the optically variable device being in the form of an electrically active layer only in a partial region thereof. If the optically variable device covers over for example an optical display element, only the part of the optically variable display which is arranged over the display element is in the form of an electrically active layer. The electrically active layers can also involve electrodes of other electronic components and/or inductors and/or capacitors and/or conductor tracks.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
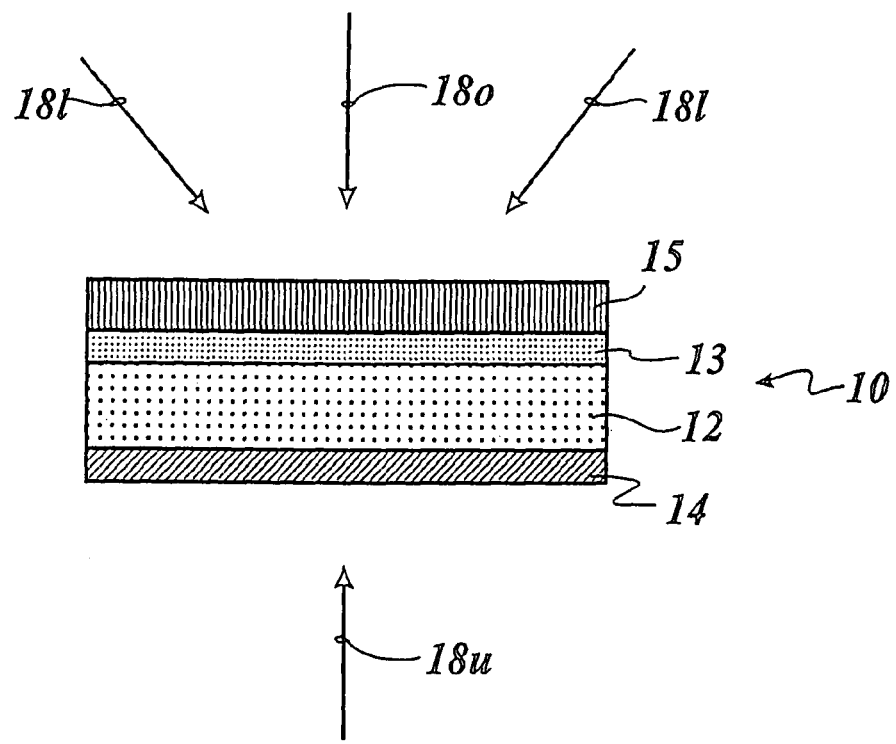
FIG. 1 shows a diagrammatic cross-sectional view of a first embodiment of a polymer display element with an electrically active layer in the form of an optically variable device.

FIG. 1 is a diagrammatic sectional view of a first embodiment of a polymer display element 10 comprising a polymer display element 12, an upper electrode layer 13 arranged thereon and a lower electrode layer 14 arranged therebeneath. The upper electrode layer 13 can be in the form of a transparent metallic layer of a thickness of 10 nm while the lower electrode layer 14 can be in the form of an opaque metallic layer of a thickness of 10 nm.

The polymer display layer 12 is formed for example from a light-emitting polymer, an electrochromic or an electronic ink. In that case, when the polymer display layer 12 is in the form of an OLED (organic light emitter diode), it can be provided that it is formed from three mutually superposed sub-layers of 200 to 300 nm thickness, 20 nm thickness and 200 to 300 nm thickness.

The lower electrode layer 14 is in the form of a fully metallised layer in which an optically active surface structure is shaped. The lower electrode layer 14 thus forms a fully metallised OVD (optically variable device, for example a diffraction grating or a hologram) and comprises for example copper, aluminium, silver, gold or chromium. The upper electrode layer 13 comprises a transparent conducting layer, for example a conductive oxide such as indium-tin oxide or also a very fine metal grating.

In that way, in a viewing direction 18o from above, the polymer display layer 12 is visible while with a viewing direction 18u from below it is invisible. Ambient light 18l impinges on the polymer display element 10 substantially from above.

It can be provided that a transparent OVD 15 is to be applied to the upper electrode layer 13. The transparent OVD 15 can be in the form of a dielectric layer with a highly refractive material such as for example $TiO_2$ or ZnS. In that respect it can be provided that the transparent OVD 15 also extends over at least one region adjoining the polymer display element 10.

The above-mentioned layers can be such that they produce optical effects which form a security feature and/or a decorative effect. In addition effects can be produced by the co-operation of two layers, for example in the form of a moiré effect, or features can be formed from the registered association of the layers, which increase the forgery-proof nature.

Figure 2:
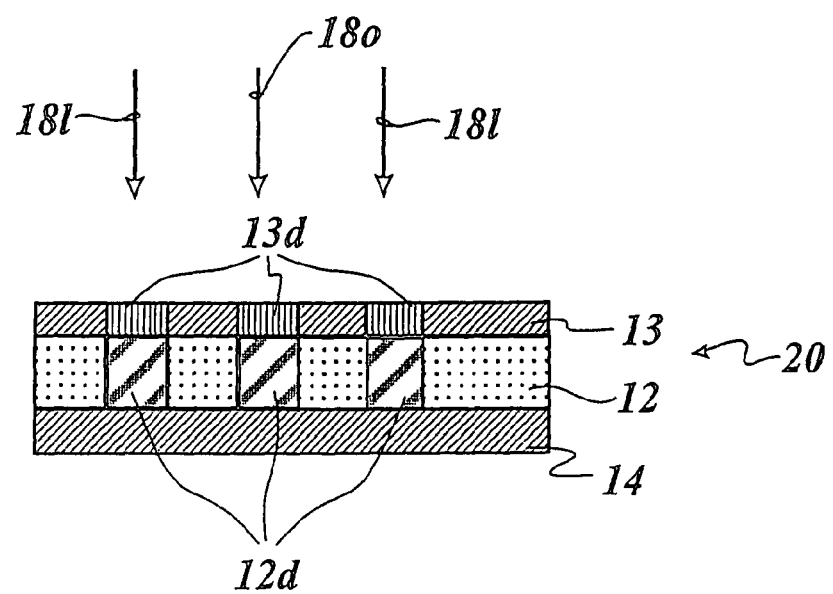
FIG. 2 shows a diagrammatic cross-sectional view of a second embodiment of a polymer display element.

FIG. 2 now shows a second embodiment of a polymer display element 20. Similar layers are denoted by the same references for the sake of enhanced clarity. The polymer display element 20 is now formed from three mutually superposed layers. The polymer display layer 12 is arranged on the lower electrode layer 14 which can be in the form of a fully metallised OVD, and the upper electrode layer 13 is arranged on the polymer display layer 12. In this embodiment the upper electrode layer 13 is in the form of a metallic electrode layer 13 with transparent micro-demetallised regions 13d. It can also be provided that the regions 13d are in the form of micro-metallised regions which differ from the metallic electrode layer 13 for example in respect of thickness. The micro-demetallised regions 13d correspond to display regions 12d of a luminescence display, which are embedded in the polymer display layer 12. The display regions 12d can preferably be light-emitting and/or colour-changing in the form of pixels and thus reproduce optical information, for example text or a logo. It can be provided that the display regions 12d are statically actuated so that they reproduce invariable information. It can also be provided however that the display regions 12d are actuated dynamically so that they output variable information, for example a pulsating colour change. Such variable information can be outputted for example if the polymer display element 20 is integrated into an RFID transponder (RFID=radio frequency identification). An RFID transponder emits a (modulated) high frequency signal when it is in an electromagnetic high frequency field tuned thereto. That procedure can be additionally optically signalled in that way.

The display regions 12d however can also involve regions which are not separate from the rest of the polymer display layer 12 and which are formed by light incidence through the upper microstructured electrode layer 13 and in that situation luminesce. Such a configuration can also be provided in the embodiments in FIGS. 3, 5 and 6.

The upper electrode layer 13 can have a microstructured surface, for example it can be in the form of a hologram. In that way the information reproduced by the display regions 12d can be embedded into the holographic image.

Figure 3:
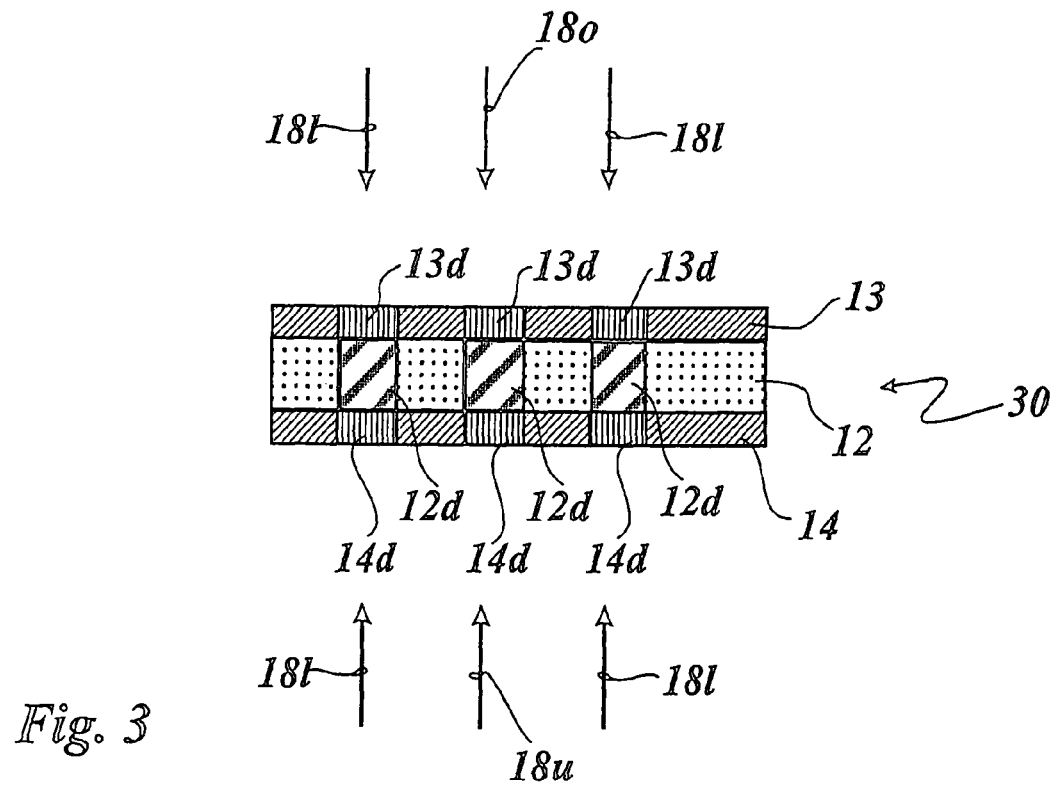
FIG. 3 shows a diagrammatic cross-sectional view of a third embodiment of a polymer display element.

FIG. 3 now shows a polymer display element 30 which like the polymer display element 20 shown in FIG. 2 is formed from three mutually superposed layers 14, 12 and 13. The display regions 12d of a luminescence display are embedded in the polymer display layer 12. In the illustrated embodiment both the upper electrode layer 13 and also the lower electrode layer 14 have micro-demetallised regions 13d and 14d which are arranged in corresponding relationship with the display regions 12d. In that way the mutually superposed regions 14d, 12d and 13d can form a pattern which, in the viewing direction 18u from below, is in mirror image relationship with the pattern which is visible from above with the viewing direction 18o. It can however also be provided that the regions 13d and 14d provide different patterns, for example mutually complementary patterns. The patterns can be for example in the form of logos or sequences of alphanumeric symbols.

It is possible for example to produce a completely complementary image by providing as follows:
the regions 13d are in the form of transparent metallised regions and the surrounding regions 13 are in the form of opaque metallised regions, and
the regions 14d are in the form of opaque metallised regions and the surrounding regions 14 are in the form of transparent metallised regions.

Such a configuration can be produced by coating both sides of the polymer display layer 12 with metal, demetallising the regions 13d and 14 in register relationship with using complementary patterns and coating both sides with a transparent metal layer.

When a complementary arrangement is involved, it can be provided that the sub-patterns which are visible from above (viewing direction 18o) and from below (viewing direction 18u) produce the optical impression of an overall pattern formed from two sub-patterns, by rapid pivoting movement of the polymer display element. Such an overall pattern can be for example in the form of a graphic logo supplemented by a piece of text. It can also be provided that the regions 13d and 14d are in the form of interactive patterns, for example by pulsating illumination of the display regions 12d.

The upper electrode layer 13 and/or the lower electrode layer 14 and/or the micro-demetallised regions 13d, 14d can be in the form of diffractive layers, for example a hologram or a diffractive grating. In that way it is possible to produce different optical effects which, besides the advantageous optical action, can include a forgery-proof security feature.

Figure 4:
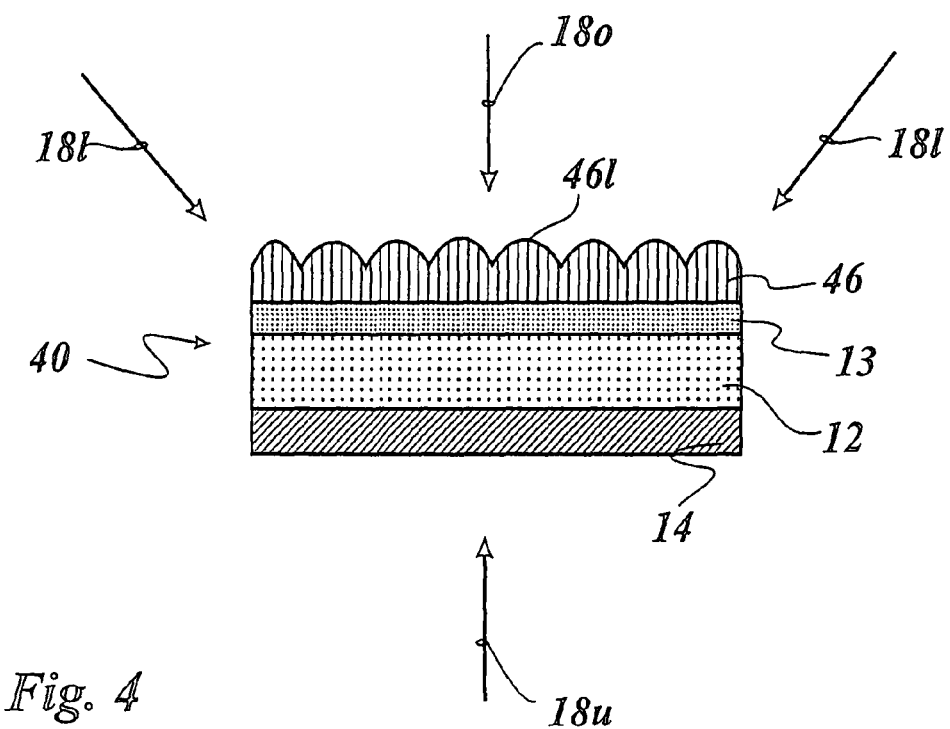
FIG. 4 shows a diagrammatic cross-sectional view of a fourth embodiment of a polymer display element.

FIG. 4 now shows a polymer display element 40 covered with a transparent micro-optical layer 46. In the illustrated embodiment this involves a macrostructure which is in the form of a microlens array, wherein the microlenses are of dimensions in the 100 μm range and are each in the form of convergent lenses. In addition the lower electrode layer 14 is in the form of a non-transparent metallic layer and the upper electrode layer 13 is in the form of a transparent conductive layer.

In the FIG. 4 embodiment the transparent micro-optical layer 46 concentrates the ambient light 18l on to the polymer display layer 12 disposed between the electrode layers 13, 14. For example in that way it is possible to make a colour change of the polymer display layer 12 particularly clearly visible. In that respect it is possible to provide an OLED configuration, as described hereinbefore with reference to FIG. 1, in which the active layer is very thin (about 10 nm). That layer can therefore be arranged at the focal point or very close to the focal point of the microlenses of the micro-optical layer 46.

Figure 5:
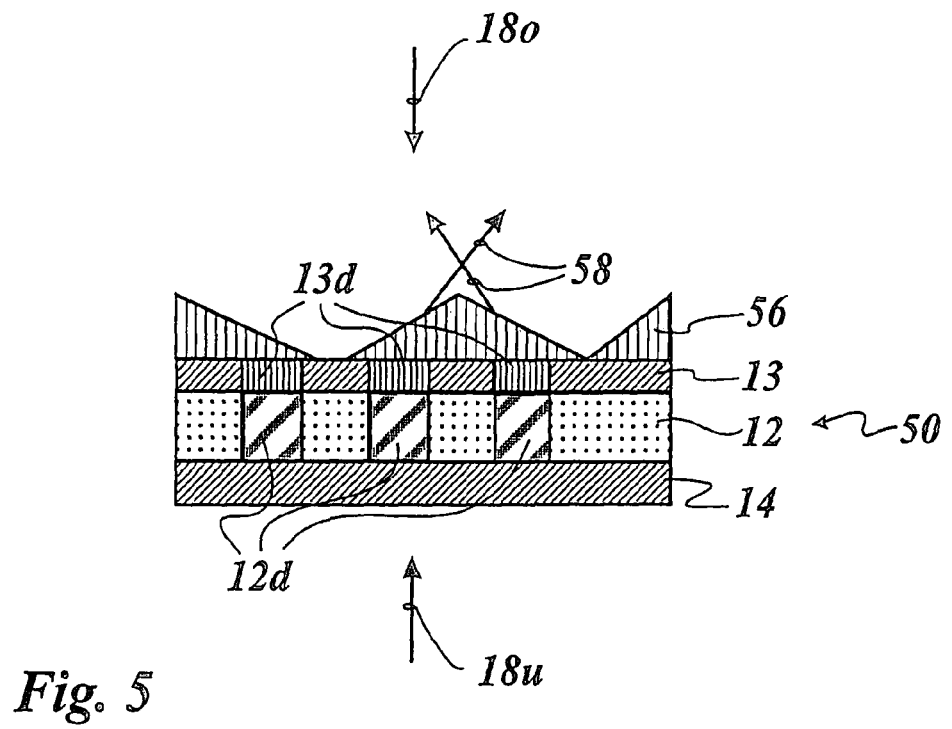
FIG. 5 shows a diagrammatic cross-sectional view of a fifth embodiment of a polymer display element.

FIG. 5 shows a polymer display element 50 covered with a diffractive OVD layer 56. The polymer display element 50 is in other respects like the polymer display element 20 shown in FIG. 2, that is to say the polymer display layer 12 is arranged on the lower electrode layer 14 which is in the form of a fully metallised OVD and disposed on the polymer display layer 12 is the upper electrode layer 13 in the form of a metallic layer with transparent micro-demetallised regions 13d. The micro-demetallised regions 13d correspond to display regions 12d of a luminescence display, which are embedded in the polymer display layer 12.

The diffractive OVD layer 56 produces a 'watermark' on the polymer display element 50 and in that fashion forms a particular feature which can be counterfeited only with a high level of complication and expenditure. This can involve a design element which lights up in a first viewing direction while the surrounding area of the design element lights up at a second viewing direction which is turned through 180° with respect to the first viewing direction. The arrows 58 shown in FIG. 5 symbolise the optical rays of the display regions 12d of the luminescence display, which are deflected by the diffractive OVD layer 56.

Figure 6:
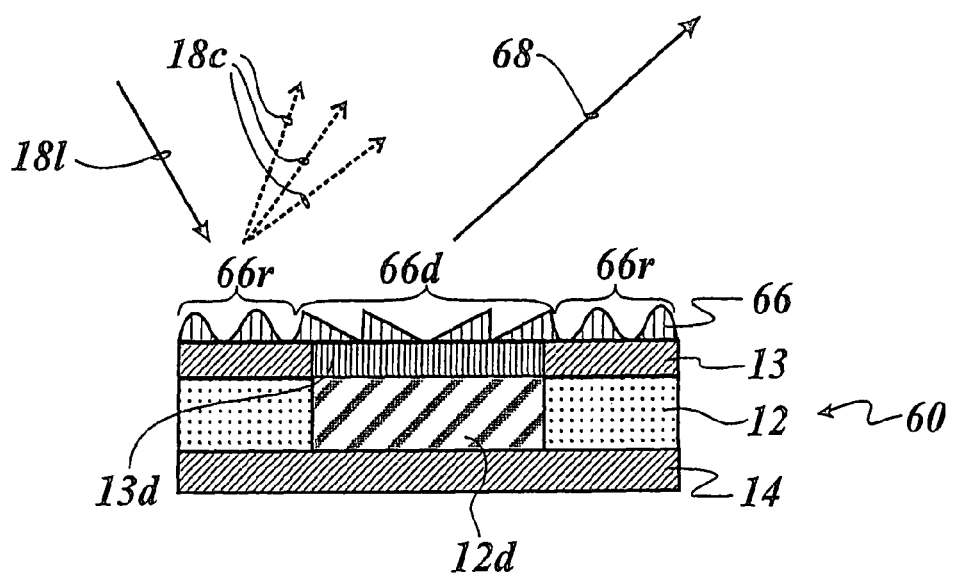
FIG. 6 shows a diagrammatic cross-sectional view of a sixth embodiment of a polymer display element.

FIG. 6 now shows a polymer display element 60 which in principle is designed like the polymer display element 50 in FIG. 5. A diffractive OVD layer 66 as the uppermost layer covers the polymer display element 60. The OVD layer 66 has reflective regions 66r and diffractive regions 66d.

The reflective regions 66r reflect the incident ambient light 18l and in so doing break it down into spectral-coloured light 18c. That produces a colour effect which is dependent both on the composition and also the angle of incidence of the ambient light 18l. Such a physical colour effect cannot be counterfeited by a colour copying process.

The diffractive regions 16d in the FIG. 6 embodiment are arranged over the display region 12d of the luminescence display and in that fashion produce a 'watermark' which, as described hereinbefore, can be an additional forgery-proof security feature.

Figure 7:
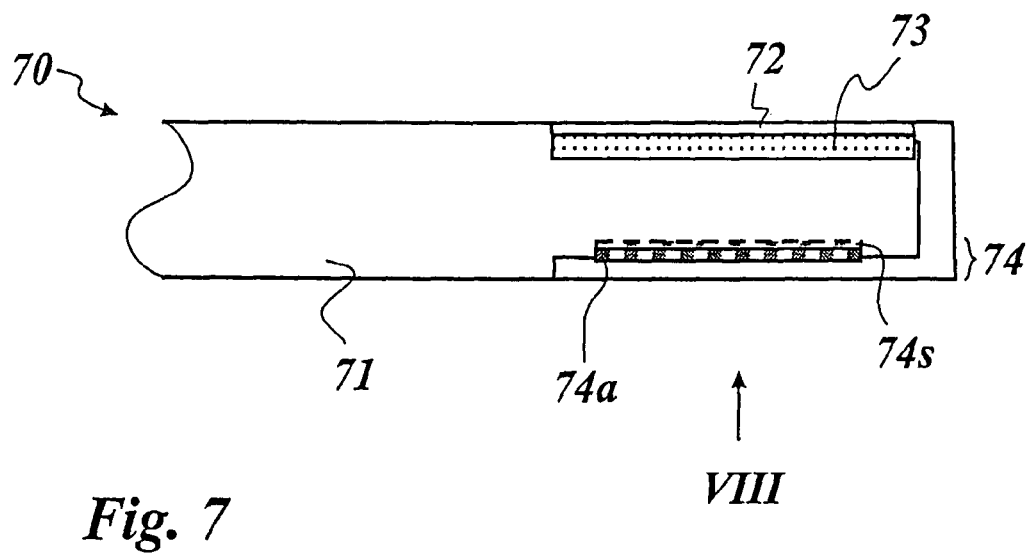
FIG. 7 shows a diagrammatic cross-sectional view of a first embodiment of a security document with an electrically active layer in the form of an optically variable device.

FIG. 7 is now a diagrammatic sectional view of a first embodiment of a security document 70 which is provided with the display elements according to the invention. The security document 70 can be a banknote, a document, a label for goods or the like. The security document 70 comprises a carrier 71 of a plastic material which is for example of a thickness of 100 μm. The carrier can also be of plastic material as is usual for example in the case of identity cards.

The carrier 71 is provided on its top side with an optically variable device 72, under which is arranged a polymer display element 73. This can be a display element as described hereinbefore with reference to FIGS. 1 to 6, that is to say the optically variable device 72 and the polymer display element 73 can form a film element. The optically variable device 72 can be in the form of a diffractive security element, for example in the form of a hologram or a Kinegram®.

Figure 8:
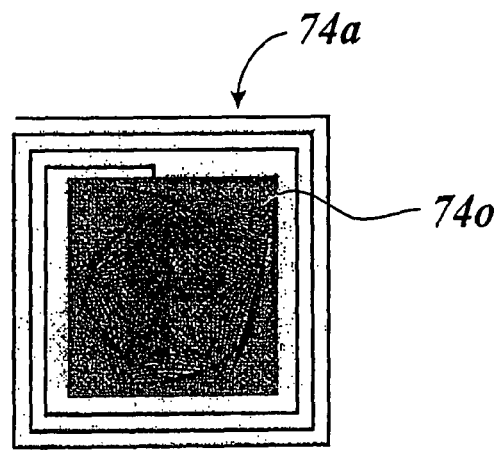
FIG. 8 shows a plan view VIII of the security document of FIG. 7.

Arranged on the underside of the carrier 71 is an RFID transponder 74 formed from an antenna 74a and an electronic circuit 74s. The RFID transponder 71 provides inter alia the supply voltage for the polymer display element 73. As can be seen in the detail view from below in FIG. 8 the antenna 74a which is arranged in a spiral configuration is also in the form of an optically variable element 74b at least in a partial region thereof and in that fashion forms an additional forgery-proof security feature. It can also be provided that further layers are arranged over the antenna 74a, which produce a colour change when the RFID transponder 74 is activated by an electromagnetic high frequency field. It can therefore be provided that a colour feature is visible in the non-activated state, which appears lighter in the activated state, or vice-versa.

Figure 9:
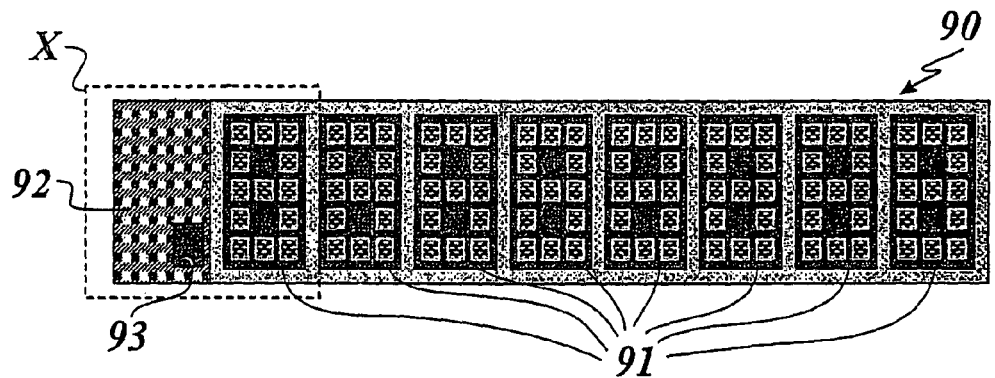
FIG. 9 shows a diagrammatic plan view of an embodiment of a polymer display with an electrically active layer in the form of an optically variable device.
Figure 10:
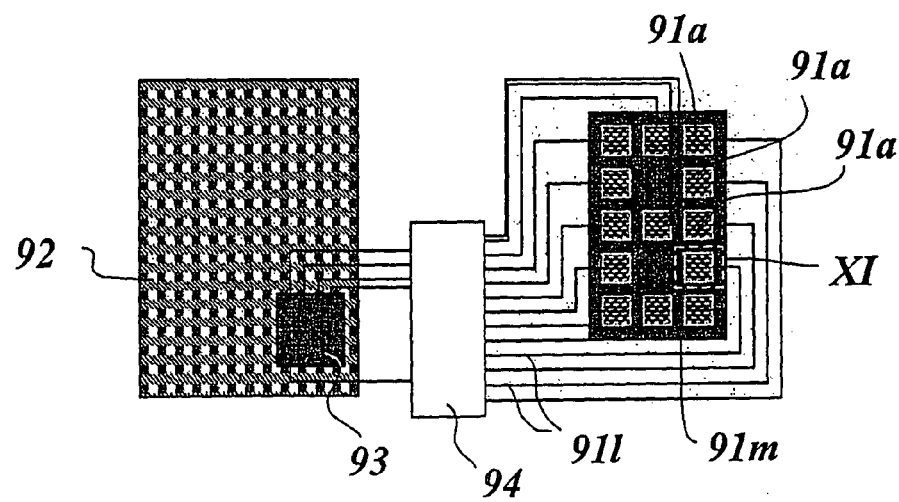
FIG. 10 shows an enlarged portion X from FIG. 9.
Figure 11:
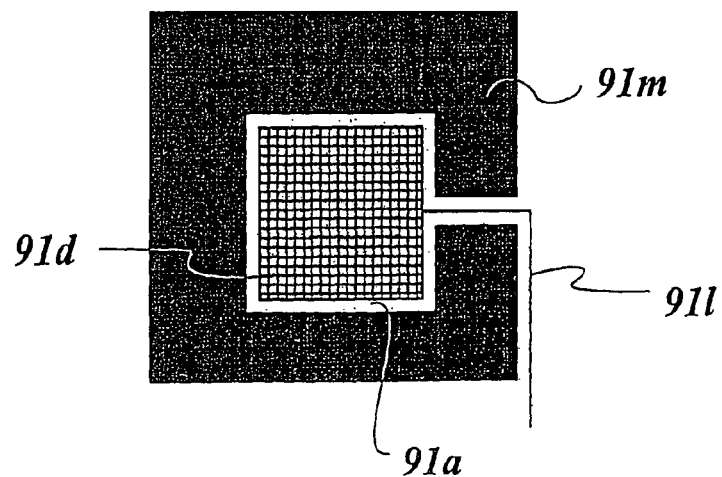
FIG. 11 shows a further enlarged portion XI from FIG. 10.
Figure 12:
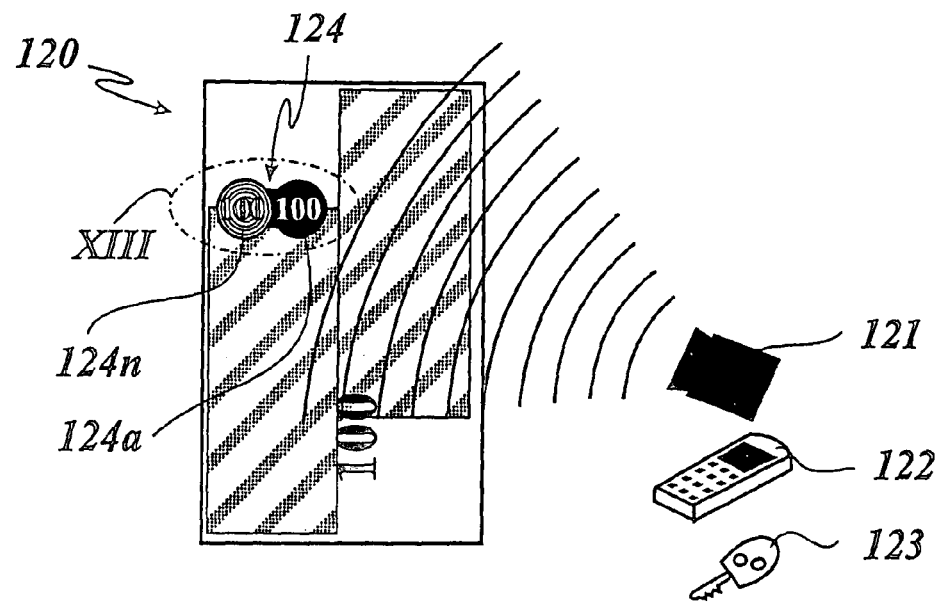
FIG. 12 shows a diagrammatic view of a second embodiment of a security document.
Figure 13:
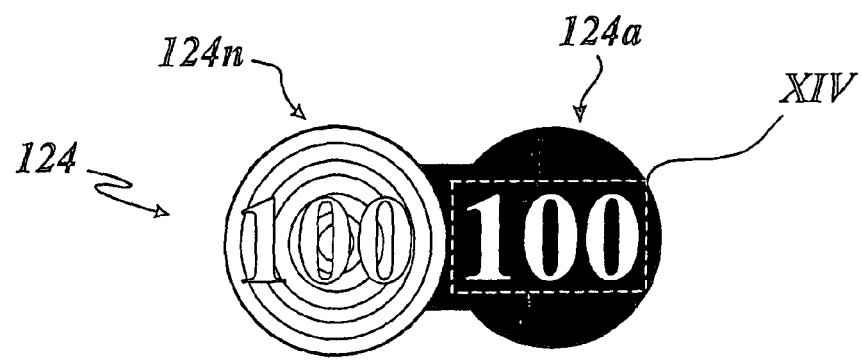
FIG. 13 shows an enlarged portion XIII from FIG. 12.

FIGS. 9 to 11 now show a polymer display 90 with eight alphanumeric display elements 91 supplied with electrical power by an antenna structure 92 and an integrated circuit 93. In the illustrated embodiment the alphanumeric display elements 91 are each formed from 13 individual display elements 91a connected to a logic switching system 94. In that way the electrical power provided by the antenna structure 92 and the integrated circuit 93 is distributed to the individual display elements 91a in such a way that the actuated individual display elements 91a of a display element 91 each form a respective alphanumeric character. The characters formed by the eight alphanumeric display elements 91 can reproduce for example an item of personalised information such as a serial number or a name.

The antenna structure 92 and the integrated circuit 93 can form an RFID transponder, wherein the integrated circuit 93 can provide the logical information for actuation of the logic switching system 94.

The antenna structure 92 can be in the form of a diffractive, optically variable device, that is to say a diffractive pattern can be shaped in the surface of the antenna structure 92. In that way not only can a security feature which is difficult to imitate be provided, but a functional improvement of the antenna structure 92 can also be achieved. More specifically, the impressed surface structure significantly enlarges the effective surface area of the antenna structure whereby the electrical quality of the antenna structure 92 is improved.

It can be provided that the integrated circuit 93 is coated with a film layer having a diffractive structure which forms an optically variable device. In that case the circuit 93 which is embedded in the antenna structure 92 can have such a surface structure that it is optically not perceptible. It can however also be provided that it stands out visually from the antenna structure 92 and together with same produces an optically interesting effect, for example in the form of a logo in front of a hologram or Kinegram®.

As can be seen from FIG. 10 and also FIG. 11, the alphanumeric display elements 91 are formed from individual display elements 91a whose upper electrode in each case is connected with an electrical line path 91l to the logic switching system 94. In this case a display element 91 can be like the display element diagrammatically shown in section hereinbefore in FIG. 2, that is to say the individual display elements 91a are provided with micro-demetallised regions 91d or with a laterally structured transparent electrode, which enable a view on to the polymer display layer arranged therebeneath. The individual display elements 91a are surrounded by a metallic electrode layer 91m. In the FIG. 9 embodiment the electrode layers 91m of the display elements 91 are delimited from each other. It can however also be provided that they form a common closed region. The electrode layers 91m can be provided with a diffractive surface structure forming an optically variable device, for example a diffraction grating for producing colour effects which are dependent on the viewing angle and the spectral composition of the ambient light.

Now, FIGS. 12 to 15 show a further embodiment of a security document with the display elements according to the invention.

In this embodiment the authenticity of a security document 120 can be checked by a special high frequency transmitter 121, a radio telephone 122 or a radio key 123. For that purpose, arranged on the security document 120 is an RFID transponder (not shown) which can be in the form of a film element. Such a film element can be concealed for example under a value imprint 124. In the illustrated embodiment a non-activatable value imprint 12n is arranged beside an activatable value imprint 124a.

Figure 14:
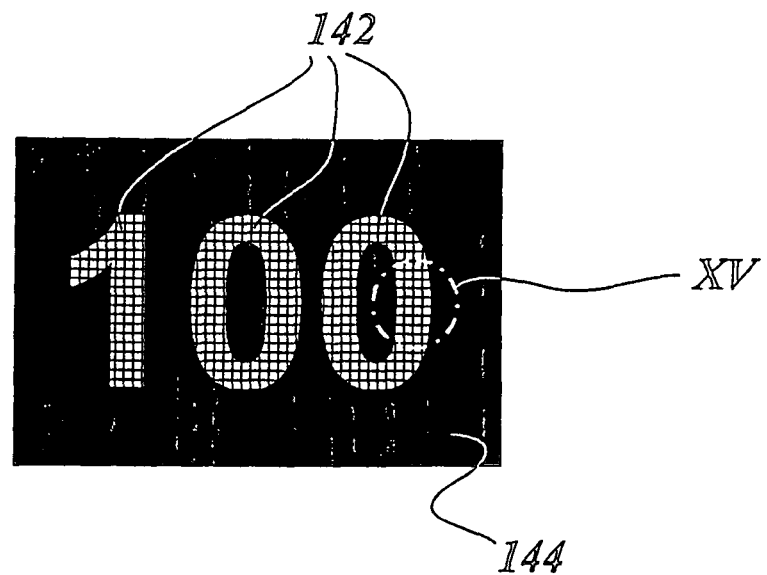
FIG. 14 shows an enlarged portion XIV from FIG. 13.
Figure 15:
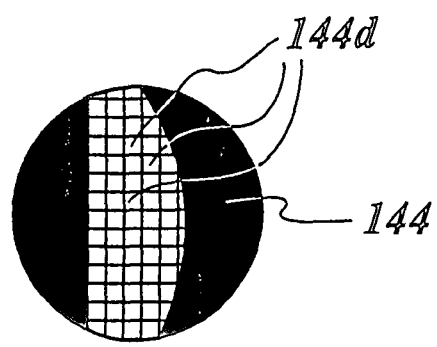
FIG. 15 shows an enlarged portion XV from FIG. 14.

The activatable value imprint 124a, as can be particularly clearly seen from FIGS. 14 and 15, is in the form of a polymer display element. The digits 142 are formed from micro-demetallised or micro-metallised regions 144d (see FIG. 15) which are arranged in a grating form and which enable a view on to display regions which are arranged therebeneath in corresponding relationship and which, as described hereinbefore with reference to FIG. 2, can be of a light-emitting and/or colour-changing nature. This can also involve a continuous areal display region. The regions 144d are arranged in a metallic electrode layer 144 which for example can be of a reflecting nature. It can however also be provided that the electrode layer 144 has a microstructured diffractive surface structure, for example with a diffraction grating. In that way the electrode layer 144 can produce changing colour effects upon changing illumination or a changing viewing direction.

If now the RFID transponder of the security document 120 is moved into a high frequency field the activatable value imprint 124a can light up. A value imprint which is activatable by the radiation from the radio telephone 122 or the radio key 123 is particularly suitable for use in relation to banknotes or value-bearing documents as such an authenticity check can be easily carried out by anyone.

The above-described value imprint can be in the form of a film element in which all described elements are integrated. Such a film element cannot be imitated with conventional copier processes. It also cannot be put together from individual elements which could possibly be commercially available.

The security elements according to the invention can be in the form of film bodies which are produced on a carrier film of a thickness of 10 µm to 100 µm. The carrier film can preferably be mono-axially or bi-axially stretched in order to minimise distortion of the carrier film in the further production procedure.

Layers in the form of optically variable devices can be applied in the form of replication lacquer layers of a thickness of 0.5 µm to 5 µm, preferably 1 µm to 2 µm, by a printing process, with a diffractive structure being replicated therein under the effect of heat and pressure. For that purpose for example a thermoplastic replication lacquer is applied over the full surface area by means of an intaglio printing roller, dried and then the diffractive structure is impressed by means of a stamping die.

In addition it is also possible for a radiation-crosslinkable lacquer to be applied as the replication lacquer and for the diffractive structure then to be shaped in the replication lacquer layer by means of UV replication.

Electrode layers or other conductive layers such as conductor tracks can be produced from a very thin metal layer, for example of gold or silver. Such layers can already be applied in structured form by means for example of a printing or vapour deposition process. It can however also be provided that the electrode layer is applied over the full surface area and then removed again in region-wise manner by means of positive/negative etching or laser ablation. In that way it is possible to produce for example micro-demetallised regions which enable a view on to polymer display layers disposed therebeneath. Instead of metallic layers it is also possible to provide layers comprising transparent, electrically conductive material, for example of indium-tin oxide or an electrically conductive polymer, preferably polyaniline or polypyrrole.

Polymer display elements can be applied for example comprising an electroluminescing material such as PPV or POLY (9,9'-dioctylfluorene) in a thickness of about 150 nm between two electrode layers.

The fact that all elements of the display and/or security element according to the invention can be combined in a film element and can be applied in a common production process provides a high level of register accuracy and means that electrodes, conductor tracks and so forth can be in the form of optically variable devices. It is also provided that optically variable elements can be in the form of inner layers, for example in the form of an electrode layer with a diffractive electrode structure, which is arranged under an optical functional layer. The optical functional layer can be a light-converging and/or light-scattering macrostructure, for example in the form of a microlens array and/or a microprism array.

The invention claimed is:

1. A bank note, value-bearing document or identity card having a security element disposed on or within a carrier substrate, the security element comprising:
   a first electrode layer;
   a second electrode layer, said second electrode layer having an optically diffractive structure comprising a diffractive surface relief shaped in an interface surface thereof; and
   a polymer display layer formed from a light-emitting polymer disposed between said first and second electrode layers,
   wherein said second electrode layer forms an optically variable device, said optically variable device producing a visible first optical effect, said visible first optical effect only being produced due to said diffractive surface relief structure formed on said second electrode and varying depending on a change of at least one of a change in viewing direction and a change in illumination direction, and
   wherein said first electrode layer, said second electrode layer and said polymer display layer together form an electrically active optical display element, said optical display element being an organic light emitter diode (OLED) and producing a second optical effect upon electrical activation, and
   wherein said second electrode layer performs a dual function of providing electrical energy to said electrically active optical display element and producing said visible first optical effect, and
   wherein the first optical effect produced by the optically variable device changes in color or in image upon a change of at least one of a change in viewing direction and a change in illumination.

2. A bank note, value-bearing document or identity card according to claim 1, wherein the electrically active optical display element forms part of at least one of an inductor and a capacitor.

3. A bank note, value-bearing document or identity card according to claim 1, wherein the electrically active optical display element forms part of an electrical oscillator circuit.

4. A bank note, value-bearing document or identity card according to claim 1, wherein a surface structure of the electrically active optical display element influences at least one of a resonance frequency and a quality of the oscillator circuit.

5. A bank note, value-bearing document or identity card according to claim 1, wherein the electrically active optical display element forms part of an RF antenna.

6. A bank note, value-bearing document or identity card according to claim 1, wherein the electrically active optical display element is an electrical connecting element.

7. A bank note, value-bearing document or identity card according to claim 1, wherein the electrically active optical display element is micro-demetallised or micro-metallised.

8. A bank note, value-bearing document or identity card according to claim 1, wherein the second electrode layer is a metallic layer.

9. A bank note, value-bearing document or identity card according to claim 1, wherein the second electrode layer is a non-metallic layer.

10. A bank note, value-bearing document or identity card according to claim 1, wherein the second electrode layer is an organic layer.

11. A bank note, value-bearing document or identity card according to claim 1, wherein the second electrode layer forms a sub-region of the optically variable device.

12. A bank note, value-bearing document or identity card according to claim 1, wherein the electrically active optical display element is covered by at least one cover layer.

13. A bank note, value-bearing document or identity card according to claim 12, wherein the cover layer is a transparent layer which has a diffractive surface relief of a second optically variable device.

14. A bank note, value-bearing document or identity card according to claim 12, wherein the cover layer has at least one of a microlens array and a microprism array.

15. A bank note, value-bearing document or identity card according to claim 12, wherein the cover layer is a transparent layer in which a macrostructure is shaped.

16. A bank note, value-bearing document or identity card according to claim 15, wherein the cover layer causes the second optical effect produced by the optical display element to appear to a viewer as a stereoscopic image.

17. A bank note, value-bearing document or identity card according to claim 12, wherein the cover layer is arranged over the optical display element.

18. A bank note, value-bearing document or identity card according to claim 12, wherein the cover layer is arranged under the optical display element.

19. A bank note, value-bearing document or identity card according to claim 1, wherein the second electrode layer forming the optically variable device is a fully metallized layer having a diffractive optically active surface relief structure shaped in an interface surface thereof.

20. A bank note, value-bearing document or identity card according to claim 1, wherein said second electrode layer forming the optically variable device is a fully metallized layer having a diffractive optically active surface relief structure shaped in said interface surface thereof.

21. A banknote, value-bearing document or identity card according to claim 1, wherein the second electrode layer forming the optically variable device is a partially metalized layer having a diffractive optically active surface relief structure shaped in an interface surface thereof.

22. A bank note, value-bearing document or identity card according to claim 1, wherein said first electrode layer is a metallic electrode layer comprising transparent micro-demetallized regions, said transparent micro-demetallized regions defining display regions of the polymer display layer.

23. A bank note, value-bearing document or identity card according to claim 1, wherein said organic light emitter diode (OLED) is shaped in the form of a pattern or a number.

24. A bank note, value-bearing document or identity card comprising:
   a plastic carrier substrate;
   a first electrode layer disposed on or within said carrier substrate;
   a second electrode layer disposed on or within said carrier substrate opposite said first electrode layer, said second electrode layer having an optically diffractive structure comprising a diffractive surface relief shaped in an interface surface thereof, said diffractive surface relief producing a visible first optical effect, said visible first optical effect changing in color or in image upon a change of at least one of a change in viewing direction and a change in illumination direction; and
   a polymer display layer comprising a non-light-emitting electrochromic ink disposed between said first and second electrode layers, said polymer display layer and said first and second electrode layers together forming an electrically active optical display element, wherein said electrochromic ink changes color upon application of an electrical voltage across said first and second electrode layers whereby said optical display element produces a second optical effect upon electrical activation, wherein said second electrode layer performs a dual function of providing electrical energy to said electrically active optical display element and producing said visible first optical effect.

25. A bank note, value-bearing document or identity card as defined in claim 24, further comprising an REID transponder including an antenna and an electronic circuit for supplying a supply voltage to said first and second electrode layers.

26. A bank note, value-bearing document or identity card as defined in claim 25, wherein said polymer display layer and said first and second electrode layers are provided on a top side of said carrier substrate and said RFID transponder is provided on an underside of said carrier opposite said top side.

27. A bank note, value-bearing document or identity card as defined in claim 25, wherein said antenna is arranged in a spiral configuration, thereby forming an optically variable element at least in a partial region thereof.

28. A bank note, value-bearing document or identity card as defined in claim 25, wherein a diffractive pattern is shaped into a surface of at least one of said antenna and said electronic circuit, thereby forming an optically variable device.

29. A banknote, value-bearing document or identity card according to claim 24, wherein said electrochromic ink changes from one color to another such that said electrochromic ink presents different colors depending on the applied electrical voltage to said optical display element for producing said second optical effect.

30. A bank note, value-bearing document or identity card according to claim 24, wherein said first electrode layer is a metallic electrode layer comprising transparent micro-demetallized regions, said transparent micro-demetallized regions defining display regions of the polymer display layer.

31. A bank note, value-bearing document or identity card comprising:
  a plastic carrier substrate;
  a first electrode layer disposed on or within said carrier substrate;
  a second electrode layer disposed on or within said carrier substrate opposite said first electrode layer, said second electrode layer having an optically diffractive structure comprising a diffractive surface relief shaped in an interface surface thereof, said diffractive surface relief producing a visible first optical effect, said visible first optical effect changing in color or in image upon a change of at least one of a change in viewing direction and a change in illumination direction; and
  a polymer display layer comprising an electronic ink disposed between said first and second electrode layers, said polymer display layer and said first and second electrode layers together forming an electrically active optical display element, wherein said electronic ink comprises a plurality of differently colored and differently charged particles arranged movably between said first and second electrode layers, a concentration of said particles at one of said first and second electrodes changing upon application of an electrical voltage across said first and second electrode layers whereby said optical display element produces a second optical effect upon electrical activation, wherein said second electrode layer performs a dual function of providing electrical energy to said electrically active optical display element and producing said visible first optical effect.

32. A banknote, value-bearing document or identity card according to claim 31, wherein said electronic ink presents different colors depending on the applied electrical voltage to said optical display element for producing said second optical effect.

33. A bank note, value-bearing document or identity card according to claim 31, wherein said second optical effect remains substantially unchanged until a fresh voltage is applied across said first and second electrode layers.

34. A bank note, value-bearing document or identity card according to claim 31, wherein said first electrode layer is a metallic electrode layer comprising transparent micro-demetallized regions, said transparent micro-demetallized regions defining display regions of the polymer display layer.

* * * * *

UNITED STATES PATENT AND TRADEMARK OFFICE
CERTIFICATE OF CORRECTION

PATENT NO.       : 8,702,005 B2                                          Page 1 of 1
APPLICATION NO.  : 11/792107
DATED            : April 22, 2014
INVENTOR(S)      : Peters et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 159 days.

Signed and Sealed this

Twenty-ninth Day of September, 2015

Michelle K. Lee
*Director of the United States Patent and Trademark Office*